United States Patent
Sekiya

(10) Patent No.: US 6,879,150 B2
(45) Date of Patent: Apr. 12, 2005

(54) MAGNETIC POSITION SENSOR

(75) Inventor: Mitsuru Sekiya, Odawara (JP)

(73) Assignee: Mikuni Corporation, Tokyo (JP)

( * ) Notice: Subject to any disclaimer, the term of this patent is extended or adjusted under 35 U.S.C. 154(b) by 17 days.

(21) Appl. No.: 10/105,183

(22) Filed: Mar. 26, 2002

(65) Prior Publication Data

US 2002/0140299 A1 Oct. 3, 2002

(30) Foreign Application Priority Data

Apr. 3, 2001 (JP) ........................................ 2001-104278

(51) Int. Cl.$^7$ .............................................. G01B 7/30
(52) U.S. Cl. .................................. 324/207.25; 324/207.2
(58) Field of Search ......................... 324/207.25, 207.24, 324/207.2, 207.21, 235, 174; 338/32 R, 32 H

(56) References Cited

U.S. PATENT DOCUMENTS

| 3,751,691 | A | * | 8/1973 | Ellis, Jr. ........................ 310/10 |
| 5,128,613 | A | * | 7/1992 | Takahashi ..................... 324/235 |
| 5,528,139 | A | | 6/1996 | Oudet et al. ............... 324/207.2 |
| 5,532,585 | A | | 7/1996 | Oudet et al. ............ 324/207.22 |
| 5,861,745 | A | * | 1/1999 | Herden ...................... 324/207.2 |
| 6,232,771 | B1 | * | 5/2001 | Herden et al. ........... 324/207.25 |

FOREIGN PATENT DOCUMENTS

| JP | 7-500421 A | 1/1995 | ............ G01B/7/00 |
| JP | 08-035809 A | 2/1996 | ............ G01B/7/30 |
| JP | 2842482 B | 10/1998 | ............ G01B/7/30 |
| JP | 2001-74409 A | 3/2001 | ............ G01B/7/30 |

* cited by examiner

Primary Examiner—Jay Patidar
Assistant Examiner—Reena Aurora
(74) Attorney, Agent, or Firm—Staas & Halsey LLP

(57) ABSTRACT

The magnetic position sensor comprises a permanent magnet piece, a first stator and a second stator arranged, opposite to each other, on an outer circular arc surface of the permanent magnet piece. A Hall element is arranged between the first stator and the second stator. An armature arranged is on an inner circular arc surface of the permanent magnet piece. Only the permanent magnet piece is formed in the rotor so as to integrally rotate, thereby detecting a rotation angle of the rotor.

21 Claims, 7 Drawing Sheets

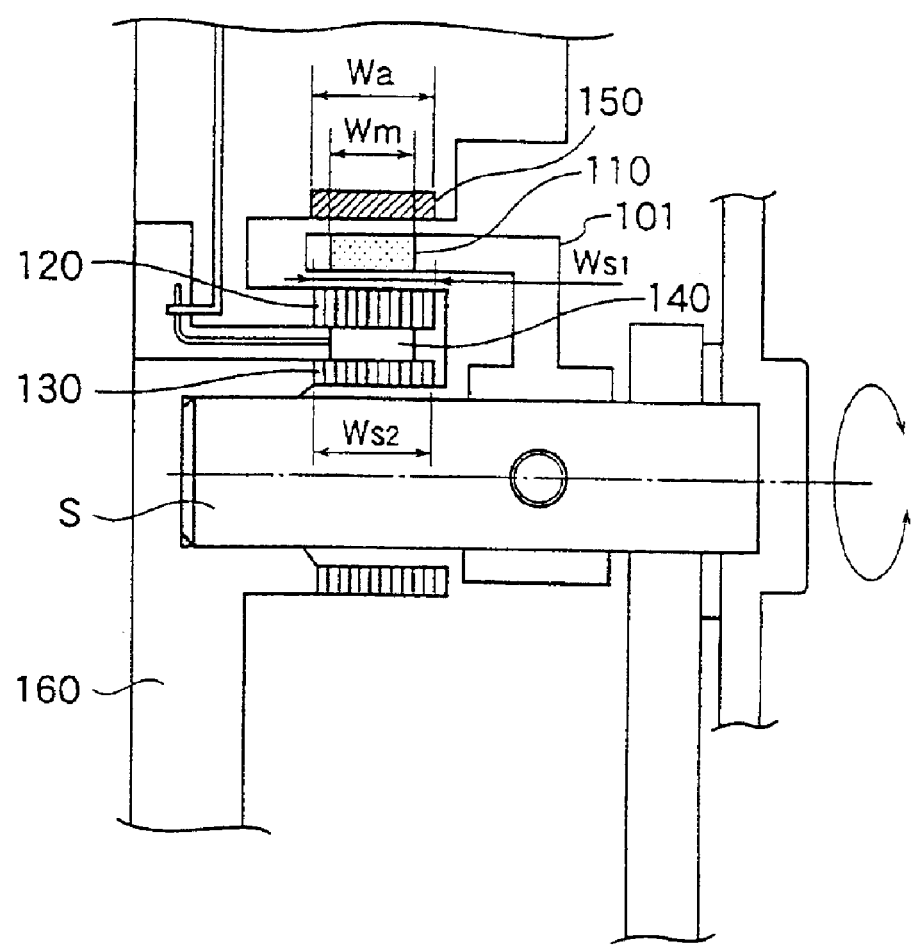

MAGNETIC POSITION SENSOR

FIELD OF THE INVENTION

The present invention relates to the field of a non-contact type magnetic position sensor which detects a change of position based on a change of magnetic flux. More particularly, this invention relates to the field of a non-contact type magnetic position sensor provided with a stator and an armature which are arranged so as to grip a permanent magnet piece from both sides.

BACKGROUND OF THE INVENTION

As a conventional magnetic position sensor, for example, there has been known that described in Japanese Patent Application Laid-Open No. H8-35809. The magnetic position sensor is constituted by a rotor provided with a cylindrical permanent magnet adhered to an inner wall surface of a cylindrical yoke (armature) fixed to a rotary shaft, two stators formed in a semicircular shape in an inner side of the rotor so as to be separated into two pieces, a Hall element arranged between these two stators, and the like.

Further, when the rotor rotates around the two stators, a magnetic flux flows, for example, according to a route in an order of the permanent magnet, one stator, the Hall element, another stator, the permanent magnet, the yoke(armature) and the permanent magnet. At this time, since the magnetic flux passing through the Hall element changes on the basis of a position of the rotor, a voltage corresponding to the change is output from the Hall element, whereby a rotation angle of the rotor is detected.

This axially symmetrical configuration prevents output fluctuation even if there occurs a displacement of the rotor.

However, in the conventional magnetic position sensor, a range in which a magnetic force changes is fixed to 180 degrees. Accordingly, when a range of detection is narrow, for example, 15 degrees, a value of the magnetic force change becomes small such as 15 degrees/180 degrees, so that since an angle of operation is detected by a little magnetic force change, an accuracy of detection becomes deteriorated. Further, it is impossible to detect at 180 degrees or more.

SUMMARY OF THE INVENTION

It is an object of the present invention to provide a magnetic position sensor which has a magnetic path configuration capable of corresponding to a cycle of magnetic force change between 10 degrees and 240 degrees, and can detect a position of a movable body at a high accuracy without affected by a position displacement such as an axial core displacement or the like, the position displacement being generated by a change with age of a supporting portion or the like supporting the movable body such as the rotor or the like.

The magnetic position sensor according to one aspect of the present invention comprises a first member and a second member forming an air gap therebetween, a permanent magnet arranged in the air gap so as to relatively rotate with respect to the first member and the second member, and opposing to each of the first member and the second member, at least one magnetic flux detecting elements arranged in at least one of the first member and the second member, which detects a change of magnetic flux and outputs a magnetic flux signal based on the change of magnetic flux, a rotor to which any one of a side of the first member and the second member, and a side of the permanent magnet is mounted, and capable of rotating around a predetermined axis, and a fixing member to which any one of the side of the first member and the second member, and the side of the permanent magnet is mounted.

The magnetic position sensor according to another aspect of the present invention comprises a first member and a second member forming an air gap therebetween, a permanent magnet arranged in the air gap so as to relatively linearly reciprocate with respect to the first member and the second member, and opposing to each of the first member and the second member, at least one magnetic flux detecting element arranged in the first member, which detects a change of magnetic flux and outputs a magnetic flux signal based on the change of magnetic flux, a movable member to which any one of a side of the first member and the second member, and a side of the permanent magnet is mounted, and capable of linearly reciprocating, and a fixing member to which any one of the side of the first member and the second member, and the side of the permanent magnet is mounted. The first member is constituted by a first stator and a second stator, a receiving space is formed between the first stator and the second stator so as to be substantially parallel to a linearly reciprocating direction of the movable member, and the magnetic flux detecting element is received in the receiving space.

Other objects and features of this invention will become apparent from the following description with reference to the accompanying drawings.

BRIEF DESCRIPTION OF THE DRAWINGS

FIG. 2 is an exploded perspective view of a permanent magnet piece, a first stator, a second stator, a magnetic sensor and an armature shown in FIG. 1, FIG. 3A to FIG. 3C are views which describe an operation of the magnetic position sensor shown in FIG. 1, in which FIG. 4B 10 is a graph which shows an output characteristic of the Hall element, FIG. 6 is a cross sectional view of a configuration shown in FIG. 5, FIG. 7A to FIG. 7C are views which describe an operation of the magnetic position sensor shown in FIG. 5, in which

DETAILED DESCRIPTIONS

Embodiments of the magnetic position sensor according to the present invention will be explained with reference to the accompanying drawings.

Figure 1:
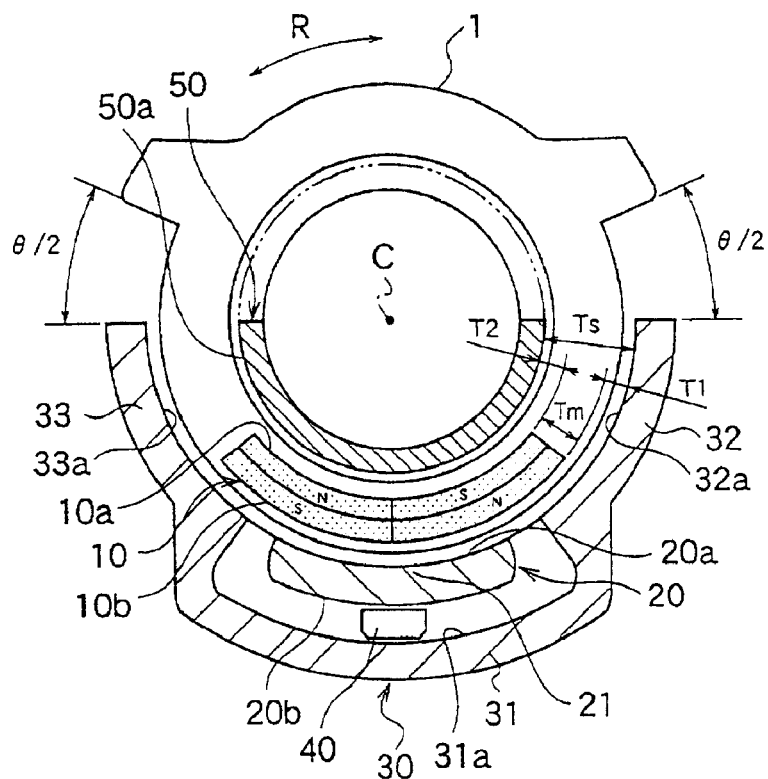
FIG. 1 is a block diagram which shows an embodiment of a magnetic position sensor according to the present invention.
Figure 2:
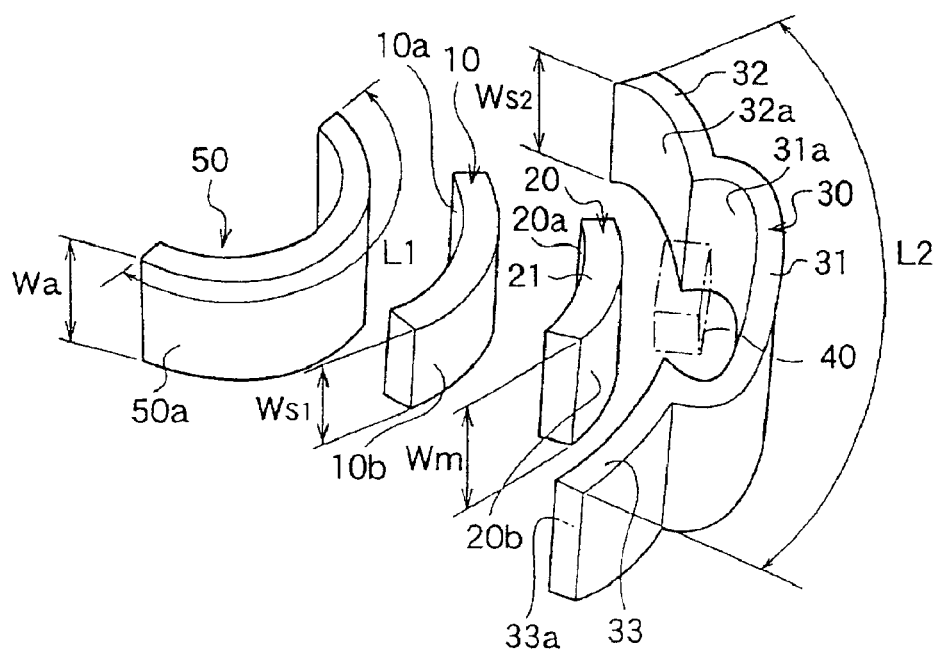

FIGS. 1 and 2 show an embodiment of the magnetic position sensor of the rotor type according to the present invention. This magnetic position sensor is provided with a permanent magnet piece 10 integrally fixed to a rotor 1, a first stator 20 and a second stator 30 arranged in an outer side in a diametrical direction of the rotor 1, a Hall element 40 arranged between the first stator 20 and the second stator 30 and serving as a magnetic sensor, an armature 50 arranged in an inner side in the diametrical direction of the rotor 1 and forming a magnetic path, and the like, as a basic configuration.

The permanent magnet piece 10 is formed, as shown in FIG. 1, so as to constitute an inner circular arc surface 10a and an outer circular arc surface 10b which are concentric with a center of rotation ("rotation center") C of the rotor 1, and is buried within the rotor 1. Further, the permanent magnet piece 10 formed in the circular arc shape is magnetized so as to have different polarities (N pole and S pole) in an inner half and an outer half in a diametrical direction passing through the rotation center C of the rotor 1, and is magnetized so that the polarity reverses on the boundary of a center portion in a rotational direction R of the rotor 1.

The first stator 20 is arranged, as shown in FIGS. 1 and 2, so as to be fixed to an outer area in the diametrical direction of the rotor 1 (and the permanent magnet piece 10) and is formed in a circular arc shape which is concentric with the rotation center C of the rotor 1, and an inner circular arc surface 20a thereof opposes to an outer circular arc surface 10b of the permanent magnet piece 10. Then, a portion close to the inner circular arc surface 20a forms a magnetic pole portion 21.

The second stator 30 is arranged, as shown in FIGS. 1 and 2, so as to be fixed to an area in an outer side in a diametrical direction of the rotor 1 (and the permanent magnet piece 10) and an area in an outer side of the first stator 20, and is constituted by a convex curved portion 31 receiving the first stator 20, and two magnetic pole portions 32 and 33 continuously formed in both sides of the convex curved portion 31.

The convex curved portion 31 and the magnetic pole portions 32 and 33 are respectively formed so as to form a circular arc shape concentric with the rotation center C of the rotor 1, and the Hall element 40 is gripped between an inner circular arc surface 31a of the convex curved portion 31 and an outer circular arc surface 20b of the first stator 20. Further, inner circular arc surfaces 32a and 33a of two magnetic pole portions 32 and 33 form the same cylindrical surface which is flush with the inner circular arc surface 20a of the first stator 20, and oppose to the outer circular arc surface 10b of the permanent magnet piece 10.

The Hall element 40 is such that it detects a change of a magnetic flux passing from the first stator 20 to the second stator 30 or from the second stator 30 to the first stator 20, and outputs a voltage value corresponding to the change as an output signal. The Hall element utilizing a Hall effect is used as a magnetic sensor, however, it may be of other magnetic sensors as long as it can detect the change of the magnetic flux.

The armature 50 is arranged, as shown in FIGS. 1 and 2, so as to be fixed to the area in the inner side in the diametrical direction of the rotor 1 (and the permanent magnet piece 10), and is formed in a circular arc shape concentric with the rotation center C of the rotor 1, and an outer circular arc surface 50a thereof opposes to the inner circular arc surface 10a of the permanent magnet piece 10.

Then, as shown in FIGS. 1 and 2, a circular arc length L1 of the armature 50 and a circular arc length L2 of the second stator 30 in a rotational direction R of the rotor 1 are formed as at least a length corresponding to a moving range of the permanent magnet piece 10. Accordingly, even if the rotor 1 rotates, the permanent magnet piece 10 does not protrude out from end portions in both sides of the armature 50 and the second stator 30, whereby a magnetic flux leakage is prevented. The armature 50 is formed in a circular arc shape, however, it is possible to employ that continuing in a ring shape.

Further, as shown in FIG. 2, a width Ws1 of the first stator 20, a width Ws2 of the second stator 30 and a width Wa of the armature 50 in a thrust direction of the rotor 1 (an axial direction of the rotary shaft) are set to be at least equal or longer than a length Wm+δ obtained by adding a displacement amount δ (a value calculated with also considering a change with age or the like) in the thrust direction of the rotor 1 to a width Wm of the permanent magnet piece 10.

Accordingly, even if the rotor 1 is displaced in the thrust direction due to a dispersion of an accuracy of assembly or a change with age or the like, the permanent magnet piece 10 does not protrude out from the end portion in the width direction of the first stator 20 and the second stator 30, and the armature 50, whereby a magnetic leakage can be prevented.

Further, the first stator 20 and the second stator 30 are fixed to the armature 50 so that a distance Ts between the both is always constant, and the magnetic flux passes in a perpendicular direction with respect to each of the circular arc surfaces, whereby a stable sensing can be executed. That is, when that the rotation center C of the rotor 1 is biased (shifted) due to a dispersion of an accuracy of size or an abrasion of the bearing portion, or the like, a distance T1 between the first stator 20 and the second stator 30, and the permanent magnet piece 10, and a distance T2 between the armature 50 and the permanent magnet piece 10 are changed, as shown in FIG. 1.

However, since the distances T1+T2 between the permanent magnet piece 10, and the stators 20 and 30 and the armature 50 is constant (Ts−Tm) as long as a thickness Tm of the permanent magnet piece 10 does not change, an intensity of the magnetic flux becomes constant. Accordingly, it is possible to execute a sensing at a high accuracy without being affected by the position displacement of the rotor 1.

Figure 3A:
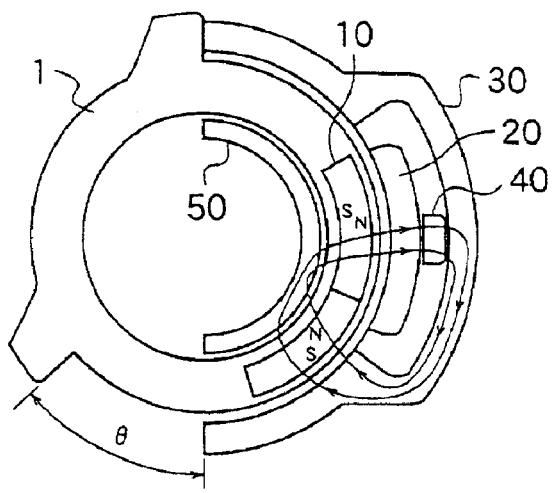
FIG. 3A shows an initial position.
Figure 3B:
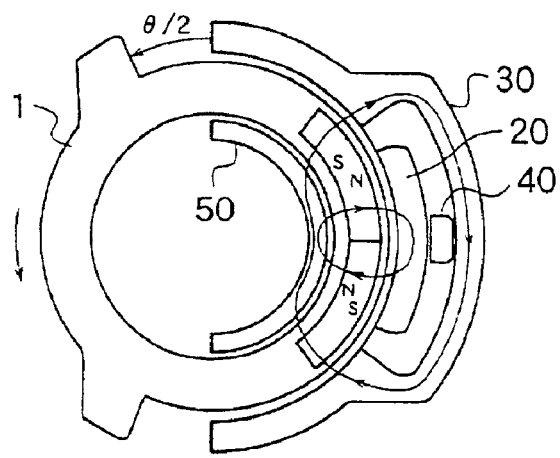
FIG. 3B shows a position at which a rotor rotates at a half of an operation angle and FIG. 3C shows a position at which the rotor rotates at maximum.
Figure 3C:
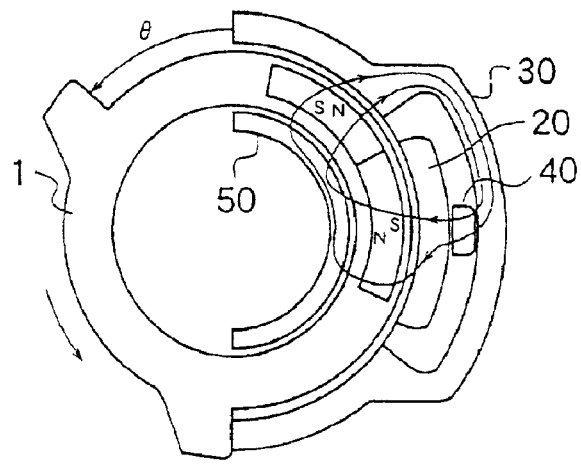
Figure 4A:
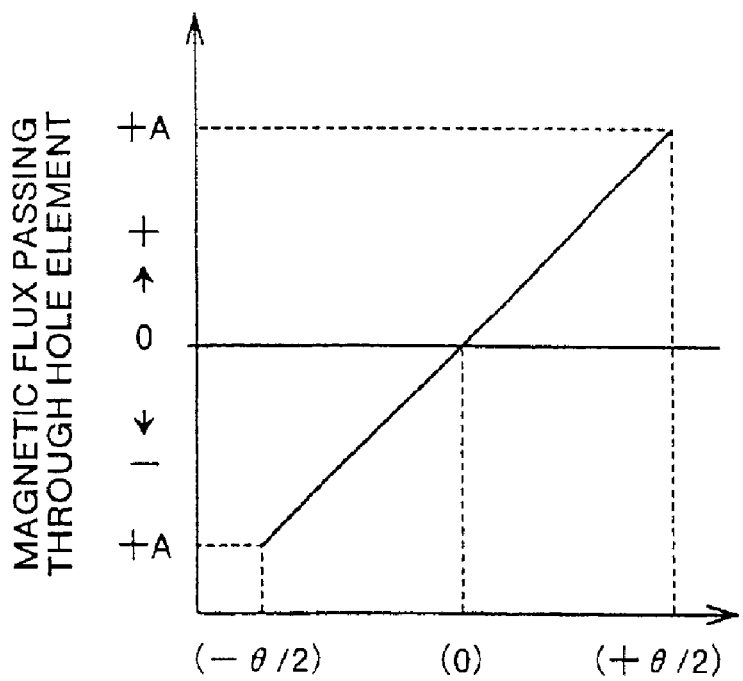
FIG. 4A is a graph which shows a magnetic flux characteristic passing through a Hall element.
Figure 4B:
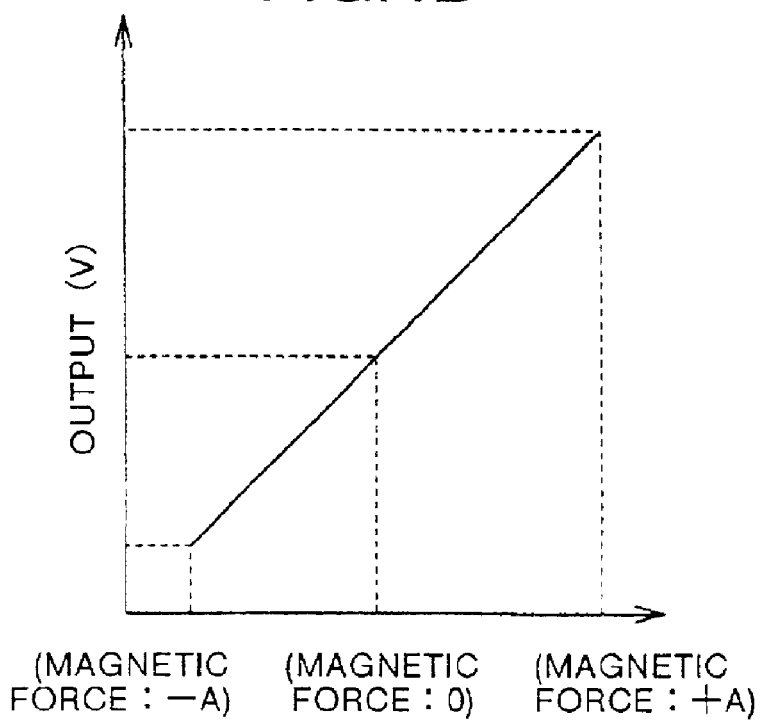

The magnetic position sensor having the configuration mentioned above has an operating angle of an angle θ, and as shown in FIG. 3A, a line of magnetic force flows as shown at a time when the rotor 1 is positioned at an end of rotation in a clockwise direction, and as shown in FIG. 4A, the magnetic flux passing through the Hall element 40 becomes −A. When the rotor 1 rotates at an angle θ/2 in a counterclockwise direction as shown in FIG. 3B, from this state, the magnetic flux passing through the Hall element 40 becomes 0 as shown in FIG. 4A. Further, when the rotor 1 rotates at an angle θ/2 in a counterclockwise direction as shown in FIG. 3C, the magnetic flux passing through the Hall element 40 becomes +A as shown in FIG. 4C. As a result, a voltage value in proportion to the rotation angle of the rotor 1 is output from the Hall element 40, as shown in FIG. 4B.

Since the magnetic position sensor can be made compact, simple in structure and light, it is preferable when detecting the rotation angle of the acceleration grip in the motor cycle or the like.

Figure 5:
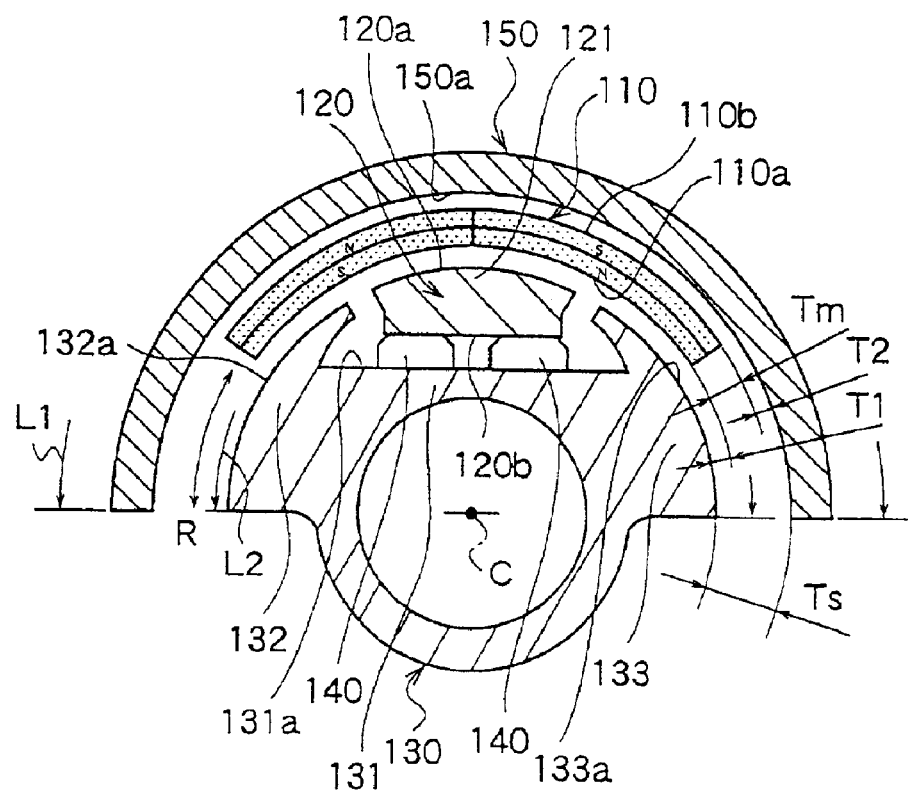
FIG. 5 is a block diagram which shows another embodiment of a magnetic position sensor according to the present invention.

FIGS. 5 and 6 shows another embodiment of the magnetic position sensor of the rotor type according to the present invention. As shown, the magnetic position sensor is provided with a permanent magnet piece 110 integrally fixed to a rotor 101 supported by a rotary shaft S in such a manner as to freely oscillate, a first stator 120 and a second stator 130 arranged in an inner side in an diametrical direction of the rotor 101, two Hall elements 140 arranged between the first stator 120 and the second stator 130 and serving as a magnetic sensor, an armature 150 arranged in an outer side in the diametrical direction of the rotor 101 and forming a magnetic path, and the like, and a basic configuration.

The permanent magnet piece 110 is formed, as shown in FIG. 5, so as to constitute an inner circular arc surface 110a and an outer circular arc surface 110b which are concentric with a rotation center C of the rotor 101 so as to be integrally formed with the rotor 101. Further, the permanent magnet piece 110 formed in the circular arc shape is magnetized in different polarities (N pole and S pole) in an inner half and an outer half in a diametrical direction passing through the rotation center C of the rotor 101, and is magnetized so that the polarity reverses on the boundary of a center portion in a rotation direction R of the rotor 101.

The first stator 120 is arranged, as shown in FIGS. 5 and 6, so as to be fixed to an area in an inner side in the diametrical direction of the rotor 101 (and the permanent magnet piece 110) and is formed so as to have an outer circular arc surface 120a which is concentric with the rotation center C of the rotor 101, and the outer circular arc surface 120a opposes to an inner circular arc surface 110a of the permanent magnet piece 110. Then, a portion close to the outer circular arc surface 120a forms a magnetic pole portion 121.

The second stator 130 is arranged, as shown in FIGS. 5 and 6, so as to be fixed to an area in an inner side in a diametrical direction of the rotor 101 (and the permanent magnet piece 110) and a further inner area of the first stator 120, and is constituted by a recess portion 131 receiving the first stator 120, and two magnetic pole portions 132 and 133 continuously formed in both sides of the recess curved portion 131.

Two magnetic pole portions 132 and 133 are respectively formed so as to have outer circular arc surfaces 132a and 133a concentric with the rotation center C of the rotor 101, on the contrary, the recess portion 131 is formed in a flat surface 131a, and the Hall elements 40 is gripped between the flat surface 131a and a flat surface 120b of the first stator 120. Further, outer circular arc surfaces 132a and 133a of two magnetic pole portions 132 and 133 form the same cylindrical surface which is flush with the outer circular arc surface 120a of the first stator 120, and oppose to the inner circular arc surface 110b of the permanent magnet piece 110.

The Hall element 140 is such that it detects a change of a magnetic flux passing from the first stator 120 to the second stator 130 or from the second stator 130 to the first stator 120, and outputs a voltage value corresponding to the change as an output signal. The Hall element utilizing a Hall effect is used as a magnetic sensor, however, it may be of other magnetic sensors as long as it can detect the change of the magnetic flux.

Further, since two Hall elements 140 are employed, it is possible to operate one when another gets out of order or the like, thereby obtaining a fail-safe function. In addition, it is also possible to set output characteristics of a plurality of Hall elements to have different slopes. thereby improving a resolving power.

The armature 150 is arranged, as shown in FIGS. 5 and 6, so as to be fixed to the area in the outer side in the diametrical direction of the rotor 101 (and the permanent magnet piece 110), and is formed in a circular arc shape concentric with the rotation center C of the rotor 101, and an inner circular arc surface 150a thereof opposes to the outer circular arc surface 110b of the permanent magnet piece 110.

Then, as shown in FIG. 5, a circular arc length L1 of the armature 150 and a circular arc length L2 of the second stator 130 in a rotational direction R of the rotor 101 are formed as at least a length corresponding to a moving range of the permanent magnet piece 110. Accordingly, even if the rotor 101 rotates, the permanent magnet piece 110 does not protrude out from end portions in both sides of the armature 150 and the second stator 130, whereby a magnetic flux leakage is prevented. The armature 150 is formed in a circular arc shape, however, it is possible to employ that continuing in a ring shape.

Further, as shown in FIG. 6, a width Ws1 of the first stator 120, a width Ws2 of the second stator 130 and a width Wa of the armature 150 in a thrust direction of the rotor 101 (an axial direction of the rotary shaft) are set to be at least equal or longer than a length Wm+δ obtained by adding a displacement amount δ (a value calculated with also considering a change with age or the like) in the thrust direction of the rotor 101 with also considering an oscillation or the like to a width Wm of the permanent magnet piece 110.

Accordingly, even if the rotor 101 is displaced in the thrust direction due to a dispersion of an accuracy of assembly or a change with age or the like, or when the oscillation of the rotor 101 becomes large, the permanent magnet piece 110 does not protrude out from the end portion in the width direction of the first stator 120 and the second stator 130, and the armature 150, whereby a magnetic leakage can be prevented.

Further, since the first stator 120 and the second stator 130 are fixed to the armature 150 by a common holding member 160, a distance Ts between the both becomes always constant, and the magnetic flux passes in a perpendicular direction with respect to each of the circular arc surfaces, a stable sensing can be executed. That is, when the rotation center C of the rotor 101 is biased (shifted) due to a dispersion of an accuracy of size or an abrasion of the bearing portion, or the like, a distance T1 between the first stator 120 and the second stator 130, and the permanent magnet piece 110, and a distance T2 between the armature 150 and the permanent magnet piece 110 are changed, as shown in FIG. 5. However, since the distances T1+T2 between the permanent magnet piece 110, and the stators 120 and 130 and the armature 150 is constant (Ts−Tm) as long as a thickness Tm of the permanent magnet piece 110 does not change, an intensity of the magnetic flux becomes constant. Accordingly, it is possible to execute a sensing at a high accuracy without being affected by the position displacement of the rotor 101.

Figure 7A:
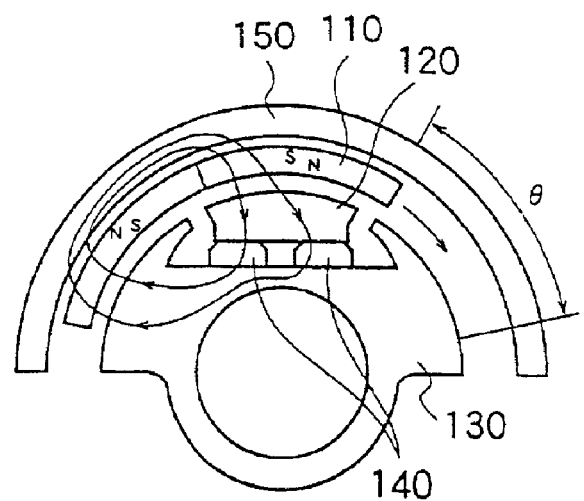
FIG. 7A shows an initial position.
Figure 7B:
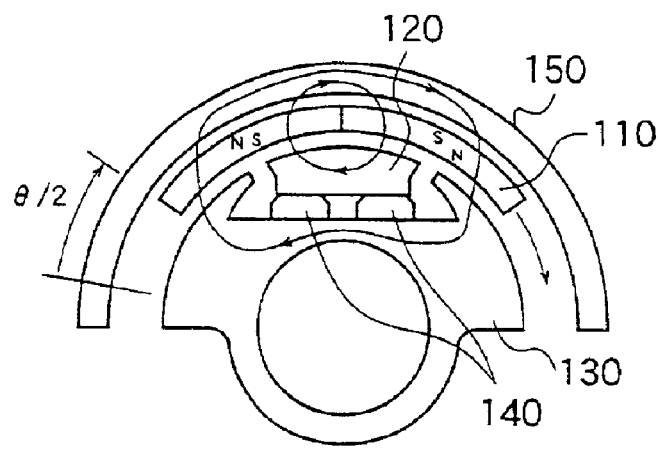
FIG. 7B shows a position at which a rotor rotates at a half of an operation angle and FIG. 7C shows a position at which the rotor rotates at maximum.
Figure 7C:
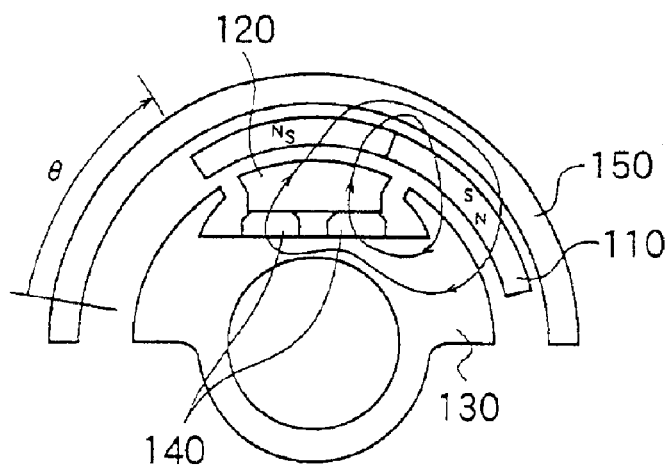

The magnetic position sensor having the configuration mentioned above has an operating angle of an angle θ, and as shown in FIG. 7A, a line of magnetic force flows as shown at a time when the rotor 101 is positioned at an end of rotation in a clockwise direction, and as shown in FIG. 4A described above, the magnetic flux passing through the Hall element 140 becomes −A. When the rotor 101 rotates at an angle θ/2 in a counterclockwise direction as shown in FIG. 7B, from this state, the magnetic flux passing through the Hall element 140 becomes 0 as shown in FIG. 4A mentioned above. Further, when the rotor 101 rotates at an angle θ/2 in a counterclockwise direction as shown in FIG. 7G. the magnetic flux passing through the Hall element 140 becomes −A as shown In FIG. 4C described above. As a result, a voltage value in proportion to the rotation angle of the rotor 101 is output from the Hall element 140, as shown in FIG. 4B described above.

In the embodiments mentioned above, there is shown the rotating rotor as the movable body, however, it is not limited to this, and it can be of other movable bodies as long as the permanent magnet piece is integrally provided with the movable body, and the configuration in which the stator and the armature are arranged in both sides of the permanent magnet piece is employed.

Figure 8:
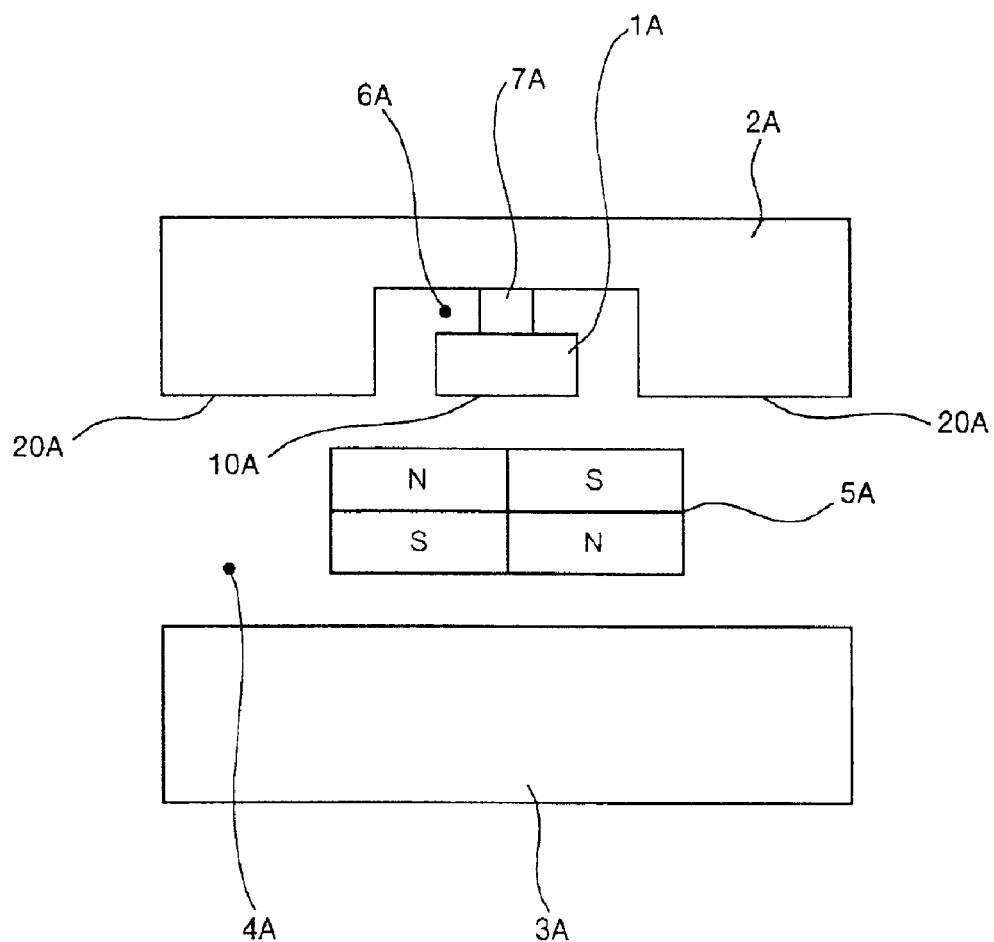
FIG. 8 is a block diagram which shows an embodiment of a linear type.

FIG. 8 is a block diagram which shows still another embodiment of the magnetic position sensor of the linear type.

In FIG. 8, reference numerals 1A and 2A denote a first stator and a second stator serving as a first member. Magnetic pole portions 10A and 20A are formed in the first stator 1A and the second stator 2A.

Further, in FIG. 8, reference numeral 3A denotes an armature serving as a second member. An air gap 4A is formed between the armature 3A, and the first stator 1A and the second stator 2A. A permanent magnet 5A is arranged in the air gap 4A, so as to be capable of relatively linearly reciprocating with respect to the first stator 1A, the second stator 2A and the armature 3A. The permanent magnet 5A opposes to each of the first stator 1A, the second stator 2A and the armature 3A.

Any one of the first stator 1A, the second stator 2A and the armature 3A, and the side of the permanent magnet 5A is mounted to a movable member (not shown) capable of linearly reciprocating. On the contrary, any one of another of the first stator 1A, the second stator 2A and the armature 3A, and the side of the permanent magnet 5A is mounted to a fixed member (not shown).

A receiving space 6A is formed between the first stator 1A and the second stat or 2A so as to be substantially parallel to a linearly reciprocating direction of the movable member. One (or a plurality of) magnetic flux detecting element 7A is received in the receiving space 6A. The magnetic flux detecting element 7A is such that it detects a change of the magnetic flux so as to output a detected signal.

The permanent magnet 5A is magnetized so as to have different polarities in a side opposing to the first stator 1A and the second stator 2A and a side opposing to the armature 3A, as shown in FIG. 8, and is magnetized so that the polarity reverses on the boundary of a center portion in the linearly reciprocating direction of the movable member.

Lengths of the first stator 1A, the second stator 2A and the armature 3A in the linearly reciprocating direction of the movable member (lengths corresponding to the lengths L1 and L2 in FIG. 2) have at least a length equal to or more than a sum of the length in the linearly reciprocating direction of the movable member in the permanent magnet 5A and a linearly reciprocating distance of the movable member.

Widths of the first stator 1A, the second stator 2A and the armature 3A orthogonal to the linearly reciprocating direction of the movable member (widths corresponding to Ws1, Ws2 and Wa in FIG. 2) have at least a length equal to or more than a sum of a width orthogonal to the linearly reciprocating direction of the movable member in the permanent magnet 5A (a width corresponding to Wm in FIG. 2) and a displacement amount 8 in a direction orthogonal to the linearly reciprocating direction of the movable member.

This linear type magnetic position sensor also provides substantially the same operational effects as those of the rotor type mentioned above.

As mentioned above, according to the magnetic position sensor of the present invention, since that which moves integrally together with the movable body is only the permanent magnet piece, it is possible to execute a sensing stably at a high accuracy without being affected by the bias of the movable body or the like.

Further, when a rotor rotatable around a predetermined axis is employed as the movable body, it is preferable, for example, to detect the rotation angle or the like of the accelerator grip in the motor cycle or the like.

Furthermore, since the movable body is made light, the possibility to have an abrasion of the supporting portion or the like is greatly reduced. Accordingly, high accuracy of the sensor will be kept for its entire lifetime.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetic position sensor comprising:
    a first member and a second member forming an air gap therebetween, the first and second members being fixed together, at least one of the first member and the second member comprising first and second stators having different sizes and different shapes and concentrically arranged around a same center;
    a permanent magnet arranged in the air gap so as to relatively rotate with respect to the first member and the second member, and opposing to each of the first member and the second member;
    a magnetic flux detecting element arranged in at least one of the first member and the second member, which detects a change of magnetic flux and outputs a magnetic flux signal based on the detected change of magnetic flux; and
    a rotor to which the permanent magnet is mounted, and capable of rotating around a predetermined axis,
    wherein widths of the first member and the second member in a thrust direction of the rotor have at least a length equal to or more than a sum of a width of the permanent magnet in the thrust direction of the rotor and a displacement amount in the thrust direction of the rotor.

2. The magnetic position sensor according to claim 1, wherein
    the permanent magnet having an outer peripheral side circular arc surface and an inner peripheral side circular arc surface which are concentric with a rotation center of the rotor,
    the first member is arranged in an outer side of the permanent magnet, and an inner peripheral side circular arc surface concentric with the rotation center of the rotor is formed in the first member so as to oppose to the outer peripheral side circular arc surface of the permanent magnet, and
    the second member is arranged in an inner side of the permanent magnet, and an outer peripheral side circular arc surface concentric with the rotation center of the rotor is formed in the second member so as to oppose to the inner peripheral side circular arc surface of the permanent magnet.

3. The magnetic position sensor according to claim 2, wherein the first member comprises the first stator and the second stator, the inner peripheral side circular arc surface being formed in the first stator, a receiving space being formed between the first stator and the second stator, an outer surface formed in the first stator in an opposite side to the inner peripheral side circular arc surface, an inner surface opposing to the outer surface of the first stator with respect to the receiving space being formed in the second stator, and the magnetic flux detecting element being positioned in the receiving space between the outer surface of the first stator and the inner surface of the second stator.

4. The magnetic position sensor according to claim 2, wherein the second member comprises the first stator and the second stator, the outer peripheral side circular arc surface being formed in the second stator, a receiving space being formed between the first stator and the second stator, opposing surfaces respectively opposing with respect to the receiving space being respectively formed in the first stator and the second stator, and the magnetic flux detecting element being positioned between the opposing surface of the first stator and the opposing surface of the second stator in a state of being gripped therebetween.

5. The magnetic position sensor according to claim 1, wherein the permanent magnet is magnetized so as to have different polarities in a side opposing to the first member and a side opposing to the second member, and is magnetized so that the polarity reverses on the boundary of a center portion in a rotational direction of the rotor.

6. The magnetic position sensor according to claim 1, wherein lengths of the first member and the second member in a rotational direction of the rotor have at least a length equal to or more than a sum of a length of the permanent magnet in the rotational direction of the rotor and a rotational distance of the rotor.

7. A magnetic position sensor comprising:
a first member and a second member forming an air gap therebetween, the first and second members being fixed together, at least one of the first member and the second member comprising first and second stators having different sizes and different shapes;
a permanent magnet arranged in the air gap so as to relatively linearly reciprocate with respect to the first member and the second member, and opposing to each of the first member and the second member;
a magnetic flux detecting element arranged in the first member, which detects a change of magnetic flux and outputs a magnetic flux signal based on the detected change of magnetic flux;
a movable member to which the permanent magnet is mounted, and capable of linearly reciprocating, wherein the first member is comprised by a first stator and a second stator, a receiving space is formed between the first stator and the second stator so as to be substantially parallel to a linearly reciprocating direction of the movable member, and the magnetic flux detecting element is positioned in the receiving space,
wherein widths of the first member and the second member orthogonal to a linearly reciprocating direction of the movable member have at least a length equal to or more than a sum of a width of the permanent magnet orthogonal to the linearly reciprocating direction of the movable member and a displacement amount in the direction orthogonal to the linearly reciprocating direction of the movable member.

8. The magnetic position sensor according to claim 7, wherein the permanent magnet is magnetized so as to have different polarities in a side opposing to the first member and a side opposing to the second member, and is magnetized so that the polarity reverses on a boundary of a center portion in a linearly reciprocating direction of the movable member.

9. A magnetic position sensor according to claim 7, wherein lengths of the first member and the second member in a linearly reciprocating direction of the movable member have at least a length equal to or more than a sum of a length of the permanent magnet in the linearly reciprocating direction of the movable member and a linearly reciprocating distance of the movable member.

10. A magnetic position sensor comprising:
an armature;
a stator assembly fixed to the armature, the stator assembly comprising first and second stators having different sizes and shapes and concentrically arranged around a same center, a first gap being between the armature and the stator assembly, and a second gap in the stator assembly between the first and second stators;
a rotor;
a permanent magnet in the first gap and attached to the rotor so that the permanent magnet rotates with the rotor with respect to the armature and the stator assembly, and thereby moves in the first gap; and
a hall element in the second gap, the hall element detecting a change in magnetic flux caused by rotation of the magnet,
wherein widths of the stator assembly and the armature in a thrust direction of the rotor have at least a length equal to or more than a sum of a width of the permanent magnet in the thrust direction of the rotor and a displacement amount in the thrust direction of the rotor.

11. The magnetic position sensor according to claim 10, wherein
the permanent magnet has an outer peripheral side circular arc surface and an inner peripheral side circular arc surface which are concentric with a rotation center of the rotor,
the stator assembly is arranged in an outer side of the permanent magnet, and an inner peripheral side circular arc surface concentric with the rotation center of the rotor is formed in the stator assembly so as to oppose to the outer peripheral side circular arc surface of the permanent magnet, and
the armature is arranged in an inner side of the permanent magnet, and an outer peripheral side circular arc surface concentric with the rotation center of the rotor is formed in the armature so as to oppose to the inner peripheral side circular arc surface of the permanent magnet.

12. The magnetic position sensor according to claim 10, wherein
the permanent magnet has an outer peripheral side circular arc surface and an inner peripheral side circular arc surface which are concentric with a rotation center of the rotor,
the armature is arranged in an outer side of the permanent magnet, and an inner peripheral side circular arc surface concentric with the rotation center of the rotor is formed in the armature so as to oppose to the outer peripheral side circular arc surface of the permanent magnet, and
the stator assembly is arranged in an inner side of the permanent magnet, and an outer peripheral side circular arc surface concentric with the rotation center of the rotor is formed in the stator assembly so as to oppose to the inner peripheral side circular arc surface of the permanent magnet.

13. The magnetic position sensor according to claim 10, wherein the permanent magnet is magnetized so as to have different polarities in a side opposing to the stator assembly and a side opposing to the armature, and is magnetized so that the polarity reverses on a boundary of a center portion in a rotational direction of the rotor.

14. The magnetic position sensor according to claim 10, wherein lengths of the stator assembly and the armature in a rotational direction of the rotor have at least a length equal to or more than a sum of a length of the permanent magnet in the rotational direction of the rotor and a rotational distance of the rotor.

15. A magnetic position sensor comprising:

an armature;

a stator assembly fixed to the armature, the stator assembly comprising first and second stators having different sizes and shapes, a first gap being between the armature and the stator assembly, and a second gap in the stator assembly between the first and second stators;

a movable member movable in a linear direction;

a permanent magnet in the first gap and attached to the movable member so that the permanent magnet moves linearly with the movable member with respect to the armature and the stator assembly, and thereby moves in the first gap; and a hall element in the second gap, the hall element detecting a change in magnetic flux caused by linear movement of the magnet, wherein widths of the stator assembly and the armature orthogonal to a linearly reciprocating direction of the movable member have at least a length equal to or more than a sum of a width of the permanent magnet orthogonal to the linearly reciprocating direction of the movable member and a displacement amount in the direction orthogonal to the linearly reciprocating direction of the movable member.

16. The magnetic position sensor according to claim 15, wherein the permanent magnet is magnetized so as to have different polarities in a side opposing to the armature and a side opposing to the stator assembly, and is magnetized so that the polarity reverses on a boundary of a center portion in a linearly reciprocating direction of the movable member.

17. A magnetic position sensor according to claim 15, wherein lengths of the stator assembly and the armature in a linearly reciprocating direction of the movable member have at least a length equal to or more than a sum of a length of the permanent magnet in the linearly reciprocating direction of the movable member and a linearly reciprocating distance of the movable member.

18. A magnetic position sensor comprising:

a first member and a second member forming an air gap therebetween, the first and second members being fixed together;

a permanent magnet arranged in the air gap so as to relatively rotate with respect to the first member and the second member, and opposing to each of the first member and the second member;

a magnetic flux detecting element arranged in at least one of the first member and the second member, which detects a change of magnetic flux and outputs a magnetic flux signal based on the detected change of magnetic flux; and a rotor to which the permanent magnet is mounted, and capable of rotating around a predetermined axis, wherein widths of the first member and the second member in a thrust direction of the rotor have at least a length equal to or more than a sum of a width of the permanent magnet in the thrust direction of the rotor and a displacement amount in the thrust direction of the rotor.

19. A magnetic position sensor comprising:

a first member and a second member forming an air gap therebetween, the first and second members being fixed together;

a permanent magnet arranged in the air gap so as to relatively linearly reciprocate with respect to the first member and the second member, and opposing to each of the first member and the second member;

a magnetic flux detecting element arranged in the first member, which detects a change of magnetic flux and outputs a magnetic flux signal based on the detected change of magnetic flux;

a movable member to which the permanent magnet is mounted, and capable of linearly reciprocating, wherein the first member is comprised by a first stator and a second stator, a receiving space is formed between the first stator and the second stator so as to be substantially parallel to a linearly reciprocating direction of the movable member, and the magnetic flux detecting element is positioned in the receiving space, and widths of the first member and the second member orthogonal to a linearly reciprocating direction of the movable member have at least a length equal to or more than a sum of a width of the permanent magnet orthogonal to the linearly reciprocating direction of the movable member and a displacement amount in the direction orthogonal to the linearly reciprocating direction of the movable member.

20. A magnetic position sensor comprising:

a first member and a second member forming an air gap therebetween, the first and second members being fixed together, at least one of the first member and the second member comprising first and second stators having different sizes and different shapes;

a permanent magnet arranged in the air gap so as to relatively rotate with respect to the first member and the second member, and opposing to each of the first member and the second member;

a magnetic flux detecting element arranged in at least one of the first member and the second member, which detects a change of magnetic flux and outputs a magnetic flux signal based on the detected change of magnetic flux; and a rotor to which the permanent magnet is mounted, and capable of rotating around a predetermined axis, wherein widths of the first member and the second member in a trust direction of the rotor have at least a length equal to or more than a sum of a width of the permanent magnet in the thrust direction of the rotor and a displacement amount in the thrust direction of the rotor.

21. A magnetic position sensor comprising:

an armature;

a stator assembly fixed to the armature, the stator assembly comprising first and second stators having different sizes and shapes, a first gap being between the armature and the stator assembly, and a second gap in the stator assembly between the first and second stators;

a rotor;

a permanent magnet in the first gap and attached to the rotor so that the permanent magnet rotates with the rotor with respect to the armature and the stator assembly, and thereby moves in the first gap; and a hall element in the second gap, the hall element detecting a change in magnetic flux caused by rotation of the magnet, wherein widths of the stator assembly and the armature in a thrust direction of the rotor have at least a length equal to or more than a sum of a width of the permanent magnet in the thrust direction of the rotor and a displacement amount in the thrust direction of the rotor.

* * * * *

UNITED STATES PATENT AND TRADEMARK OFFICE
CERTIFICATE OF CORRECTION

PATENT NO.    : 6,879,150 B2
DATED         : April 12, 2005
INVENTOR(S)   : Mitsuru Sekiya It is certified that error appears in the above-identified patent and that said Letters Patent is hereby corrected as shown below:

Column 12,
Line 39, change "trust" to -- thrust --.

Signed and Sealed this

Eighth Day of November, 2005

JON W. DUDAS
*Director of the United States Patent and Trademark Office*